(No Model.)

W. L. VESTAL.
FLOWER POT.

No. 515,032. Patented Feb. 20, 1894.

Witnesses

Inventor
W. L. Vestal
By John Wedderburn
Attorney

UNITED STATES PATENT OFFICE.

WARNER L. VESTAL, OF SAN BERNARDINO, CALIFORNIA.

FLOWER-POT.

SPECIFICATION forming part of Letters Patent No. 515,032, dated February 20, 1894.

Application filed May 3, 1893. Serial No. 472,824. (No model.)

*To all whom it may concern:*

Be it known that I, WARNER L. VESTAL, of San Bernardino, in the county of San Bernardino and State of California, have invented certain new and useful Improvements in Flower-Pots; and I do hereby declare the following to be a full, clear, and exact description of the invention, such as will enable others skilled in the art to which it appertains to make and use the same.

This invention relates to flower pots, and is particularly designed for removing the plant, or shrub from the pot. In pots as ordinarily constructed, it often becomes necessary to cut the roots of the plant or shrub, or break the pot in order to extract the plant and earth from the pot for the purpose of transplating.

It is the object of my invention to provide certain novelties of construction whereby these evils may be avoided, and the plant can be easily removed without damage to the roots or pot.

With these objects in view, my invention consists in the peculiar construction of the several parts, and their novel combination or arrangement, all of which will be fully described and claimed.

Figure 1:
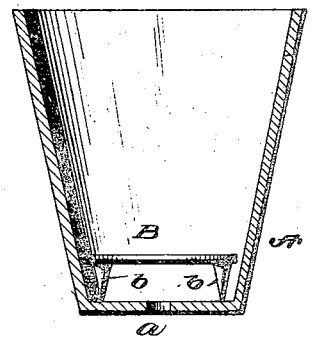
Figure 2:
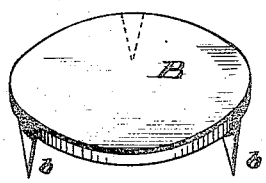
Figure 3:
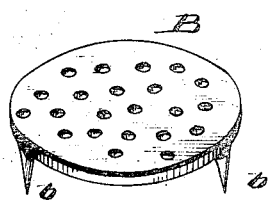
Figure 4:
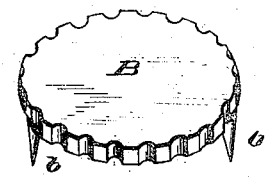

In the drawings forming a part of this specification: Figure 1, is a sectional view of my improvement. Fig. 2, is a detail view of the false bottom, and Figs. 3 and 4, show modifications.

Referring to the drawings, A, indicates an ordinary flower pot, having the perforation $a$, in the bottom of the same. This pot may be made of any suitable material and of any size desired.

Within the pot A, I arrange what I term a false bottom B, which is somewhat smaller than the bottom of the pot, and is supported upon three or more legs $b$, formed integral therewith. This supports the false bottom above the bottom of the pot, and permits the water to escape through the bottom aperture. The false bottom is usually made unperforated, but if desired, it may be made perforated as shown in Fig. 3, or it may be notched at the edge, as shown in Fig. 4. If desired, the legs may be formed in the bottom of the pot, and just a plain plate formed to rest thereon.

The plant rests upon the false bottom B, and when it is desired to remove the plant, a rod is inserted through the bottom aperture, thus forcing the false bottom up, which acting in the nature of a plunger raises the plant and surrounding earth.

Having thus described my invention, what I claim is—

The combination with a flower pot, having an opening in the bottom thereof, of an elevated false bottom having legs resting upon the said bottom of the flower pot, said legs being located near the perimeter of the bottom, substantially as described.

In testimony whereof I have signed this specification in the presence of two subscribing witnesses.

WARNER L. VESTAL.

Witnesses:
F. W. RICHARDSON,
EDWARD N. BUCK.